(12) United States Patent
Mardi et al.

(10) Patent No.: US 9,283,925 B2
(45) Date of Patent: Mar. 15, 2016

(54) INTEGRATED ACTIVE HINGE MECHANISM

(71) Applicants: Manohar Ramdas Mardi, West Bloomfield, MI (US); Thomas W. Messner, Grand Blanc, MI (US)

(72) Inventors: Manohar Ramdas Mardi, West Bloomfield, MI (US); Thomas W. Messner, Grand Blanc, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/557,399

(22) Filed: Dec. 1, 2014

(65) Prior Publication Data

US 2015/0151712 A1 Jun. 4, 2015

Related U.S. Application Data

(60) Provisional application No. 61/910,281, filed on Nov. 29, 2013.

(51) Int. Cl.
*B60R 21/38* (2011.01)

(52) U.S. Cl.
CPC .................................. *B60R 21/38* (2013.01)

(58) Field of Classification Search
CPC ......................................................... B60R 21/38
USPC .................................................. 296/193.11
See application file for complete search history.

(56) References Cited

U.S. PATENT DOCUMENTS

| 7,730,990 B2 * | 6/2010 | Boggess ................ B60R 21/38 180/274 |
|---|---|---|
| 2005/0285431 A1 | 12/2005 | Rex et al. |
| 2008/0174124 A1 | 7/2008 | Takahashi et al. |
| 2009/0229485 A1 | 9/2009 | Parks |
| 2009/0229901 A1 | 9/2009 | Aoki et al. |
| 2013/0025958 A1 | 1/2013 | McIntyre |

* cited by examiner

*Primary Examiner* — Pinel Romain
(74) *Attorney, Agent, or Firm* — L.C. Begin & Associates, PLLC.

(57) ABSTRACT

An active hinge mechanism structured for lifting a portion of a hood of a vehicle is provided. The mechanism includes a tubular link structured for operative coupling to the hood so as to transmit a lifting force to the hood after activation of the mechanism.

9 Claims, 5 Drawing Sheets

INTEGRATED ACTIVE HINGE MECHANISM

CROSS-REFERENCE TO RELATED APPLICATIONS

This application claims the benefit of U.S. Provisional Application Ser. No. 61/910,281, filed on Nov. 29, 2013, the disclosure of which is incorporated herein by reference in its entirety.

BACKGROUND OF THE INVENTION

The embodiments described herein relate to pedestrian safety system and, more particularly, to systems and mechanisms structured for lifting a portion of a hood of a vehicle responsive to a detected actual or imminent contact between the vehicle and a pedestrian.

SUMMARY OF THE INVENTION

In one aspect of the embodiments described herein, an active hinge mechanism structured for lifting a portion of a hood of a vehicle is provided. The mechanism includes a tubular link structured for operative coupling to the hood so as to transmit a lifting force to the hood after activation of the mechanism.

BRIEF DESCRIPTION OF THE DRAWINGS

The accompanying drawings, which are incorporated in and constitute a part of this specification, illustrate embodiments of the invention and together with the description serve to explain principles of the invention.

DETAILED DESCRIPTION

Figure 1:
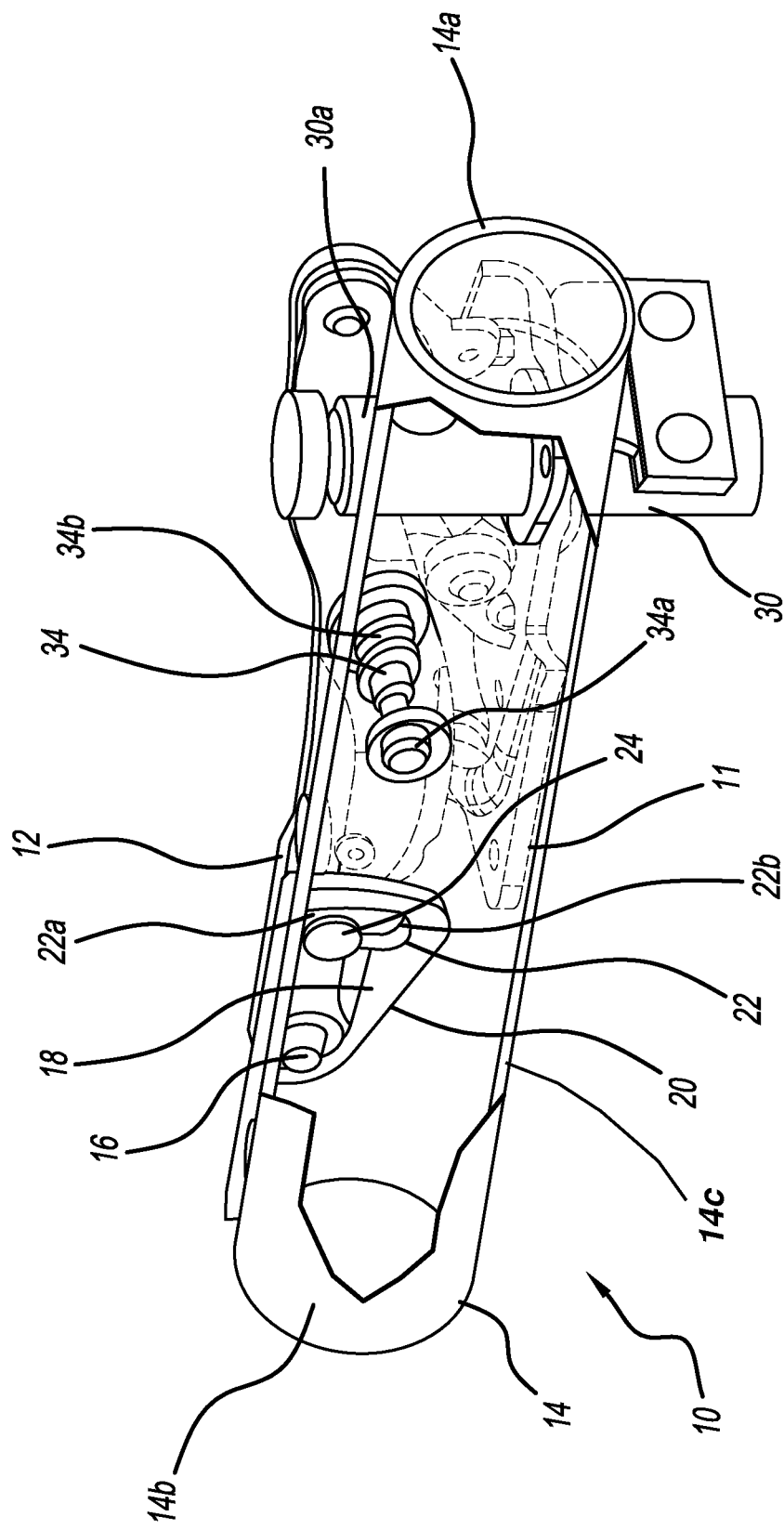
FIG. 1 is a partial cutaway perspective view of an integrated active hinge mechanism in accordance with one embodiment of the present invention, shown prior to activation of the hinge mechanism.

Like reference numerals refer to like parts throughout the description of several views of the drawings. In addition, while target values are recited for the dimensions of the various features described herein, it is understood that these values may vary slightly due to such factors as manufacturing tolerances, and also that such variations are within the contemplated scope of the embodiments described herein.

FIGS. 1-7 show various features of embodiments of an integrated active hinge mechanism, generally designated 10, attachable to a portion of a motor vehicle 9 to lift or elevate a rear portion 100a of a vehicle hood 100 (FIGS. 5 and 7) (i.e., the portion of the hood adjacent the windshield 99) in the event that the moving vehicle makes contact with a pedestrian. If desired, a pair 10, 10' of active hinge mechanisms (FIG. 7) in accordance with embodiments described herein, may be spaced laterally apart from a fore-aft axis of the vehicle (not shown) on either side of the axis under the vehicle hood 100, and operatively coupled to portions of the vehicle and the underside of the hood proximate the rear of the hood. When activated, these mechanisms combine to lift spaced apart portions of the rear of the hood, in a known manner. As known in the pertinent art, lifting the rear portion of the hood and maintaining the elevated hood portion in a position spaced apart from its normal resting position on the vehicle can aid in cushioning the impact of a pedestrian on this portion of the hood. The various components of the hinge mechanism as described herein may be formed from metallic materials, polymers, or any other suitable material or materials.

Referring to FIGS. 1-4, in one embodiment, hinge mechanism 10 includes a base portion 11, an intermediate link 12 rotatably coupled to the base portion 11, and a tubular link 14 rotatably coupled to the intermediate link 12. Base 11 is structured for attachment to a portion of the vehicle other than hood 100, using rivets, bolts, welding or any other suitable attachment method or methods. Base 11 serves as an anchor or base with respect to which the other portions of the hinge mechanism move to lift the hood 100 after mechanism activation. Attachment of the base 11 to the vehicle thus secures the active hinge mechanism 10 to the vehicle. In a particular embodiment, base 11 is a base or lower hinge element from a known pedestrian hood lifting mechanism.

In one embodiment, intermediate link 12 is rotatably coupled to base 11, using rivets, pins or any other suitable attachment method or methods. In one embodiment, one or more portions of the intermediate link 12 are structured to reside within the interior of the tubular link 14 when the link 12 is attached to the tubular link, while other portions of the intermediate link may extend outside the tubular link interior for attachment to the base 11 or to other portions of the vehicle.

In one embodiment, a series of spaced-apart holes is formed along the intermediate link 12 to receive therein portions of pivot element 16 and (optionally) a pin 34a comprising part of a reset latch or mechanism (all described in greater detail herein). For example, in the embodiment shown in FIGS. 1 and 2, a hole 12a is provided in intermediate link 12 for pivot element 16, and a hole 12c is provided for shear pin 40a. If desired, an additional hole 12d may be provided for reset pin 34a.

In a particular embodiment, intermediate link 12 is a known intermediate link or other portion of a known hood lifting mechanism that is attachable to the vehicle to secure the hood lifting mechanism to the vehicle. This portion of a known hood lifting mechanism may be adapted as herein (for example, by the addition of holes 12a, 12c, and 12d previously described) to accommodate and operate with components of the various embodiments of the integrated active hinge mechanism described herein.

In one embodiment, tubular link 14 is rotatably coupled to the intermediate link 12 using a pivot element 16 or any other suitable mechanism (for example, a rivet or pin). Tubular link 14 rotates with respect to intermediate link 12 about pivot 16 during actuation of the active hinge mechanism. Tubular link 14 is also attached to the portion of the hood to be lifted. In a particular embodiment, the tubular link 14 is structured to attach to the hood at the same location (or locations) on the hood at which an upper link of a conventional hood lifter is attached.

In one embodiment, as shown in the drawings, tubular link 14 has a first end 14a, a second end 14b rotatably secured to the intermediate link 12, and a cylindrical outer wall 14c defining an interior or enclosure structured to receive therein (and to serve as a housing for) portions of various other elements of the hinge mechanism, such as pivot element 16, shear pin 40a, limiting element 24, reset pin 34a, and a portion of actuator 30. This structure enables these components to be integrated into the tubular link.

In an alternative embodiment, the tubular link has a rectangular or box-like cross-sectional shape which also defines an interior structured to receive therein (and to serve as a housing for) portions of the various other elements of the hinge mechanism as described herein.

In one embodiment, intermediate link 12 is also coupled to tubular link 14 by a suitable detent mechanism, generally designated 40, prior to activation of the hinge mechanism. The detent mechanism acts to maintain the tubular link in the pre-actuation orientation with respect to the intermediate link 12 prior to mechanism activation, and ensures that a certain threshold of force must be reached to disengage the detent before the tubular link 14 can rotate with respect to the intermediate link 12 and/or base 11, thereby impeding or preventing unintended rotation of the tubular link. In one embodiment, the detent mechanism is in the form of a shear pin 40a inserted into associated holes or openings formed in the intermediate link 12 and tubular link 14 after the associated holes have been coaxially aligned.

In an alternative embodiment, tubular link 14 is coupled to base 11 by a suitable detent mechanism (not shown) prior to activation of the hinge mechanism. The detent mechanism acts to maintain the tubular link in the pre-actuation orientation with respect to the base 11 prior to mechanism activation, and ensures that a certain threshold of force must be reached to disengage the detent before the tubular link 14 can rotate with respect to the intermediate link 12 and/or base 11, thereby impeding or preventing unintended rotation of the tubular link. In one embodiment, the detent mechanism is in the form of a shear pin 40a inserted into associated holes or openings formed in the base 11 and tubular link 14 after the associated holes have been coaxially aligned.

In another alternative embodiment, a resettable detent mechanism (for example, a protrusion formed in one of the base 11 and the tubular link and extending into a complementary cavity formed in the other one of the base and the tubular link) may be used. Such a system is configured so that application of at least a predetermined threshold force to the tubular link and the associated detent mechanism will cause the protrusion to be forced out of the cavity, thereby releasing the tubular link for rotation with respect to the base 11 and intermediate link 12. This detent mechanism can be reset by rotating the tubular link with respect to the base until the protrusion is re-inserted in the associated cavity after deployment of the hinge mechanism. Various alternative forms of detent mechanism may also be used.

Figure 2:
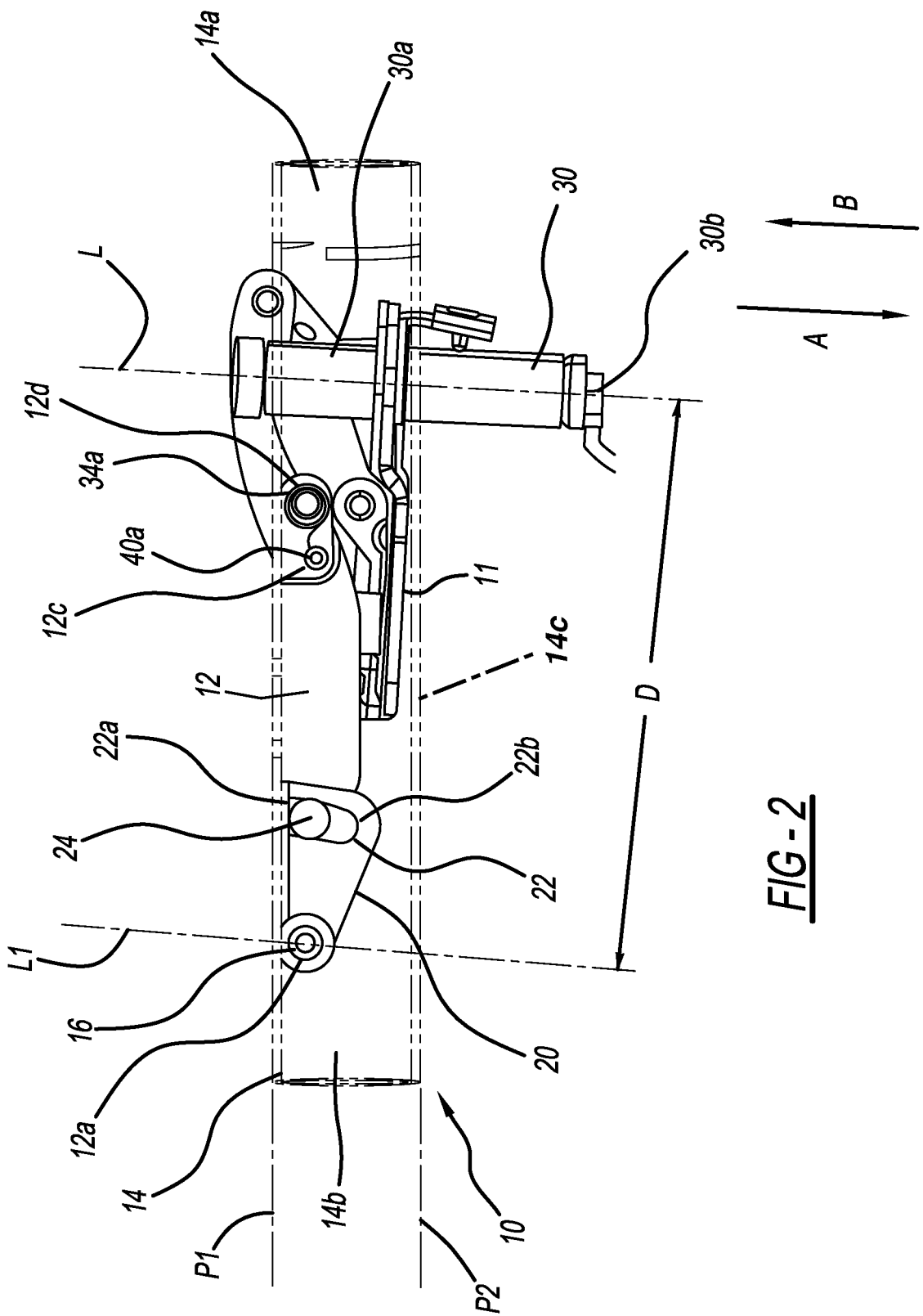
FIG. 2 is a cross-sectional side view of the embodiment shown in FIG. 1, with the tubular link 14 shown in phantom to illustrate the arrangement of the various mechanism elements between planes P1 and P2 defined by opposite sides of the tubular link 14.
Figure 3:
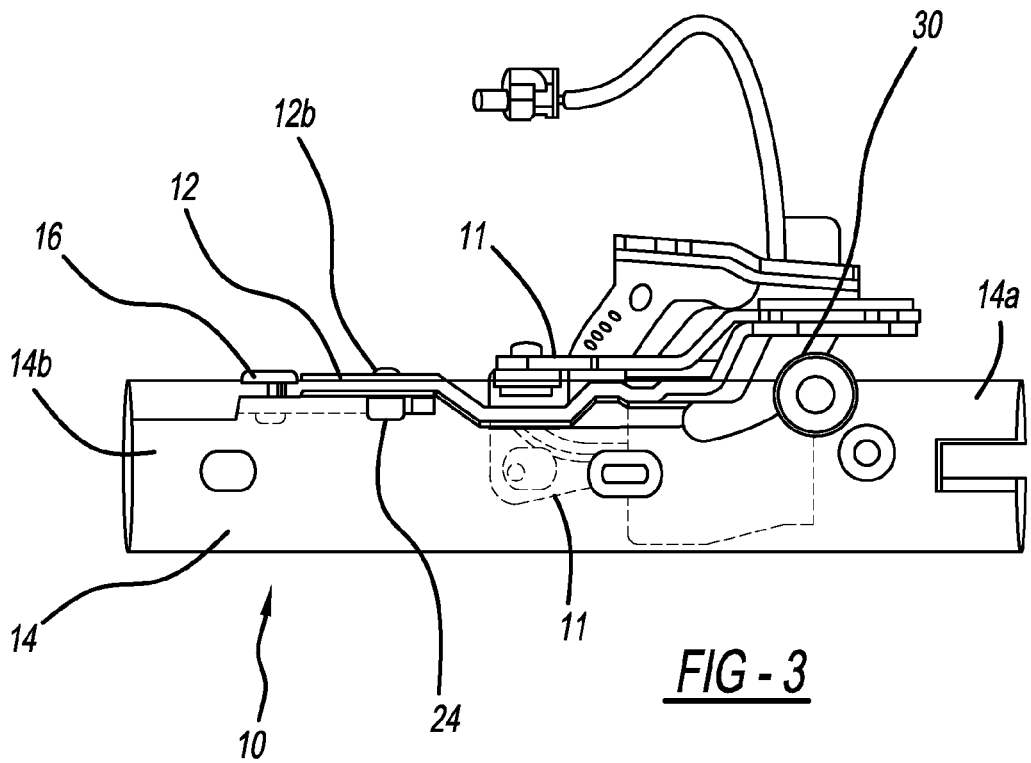
FIG. 3 is a plan view of the embodiment shown in FIG. 2.
Figure 4:
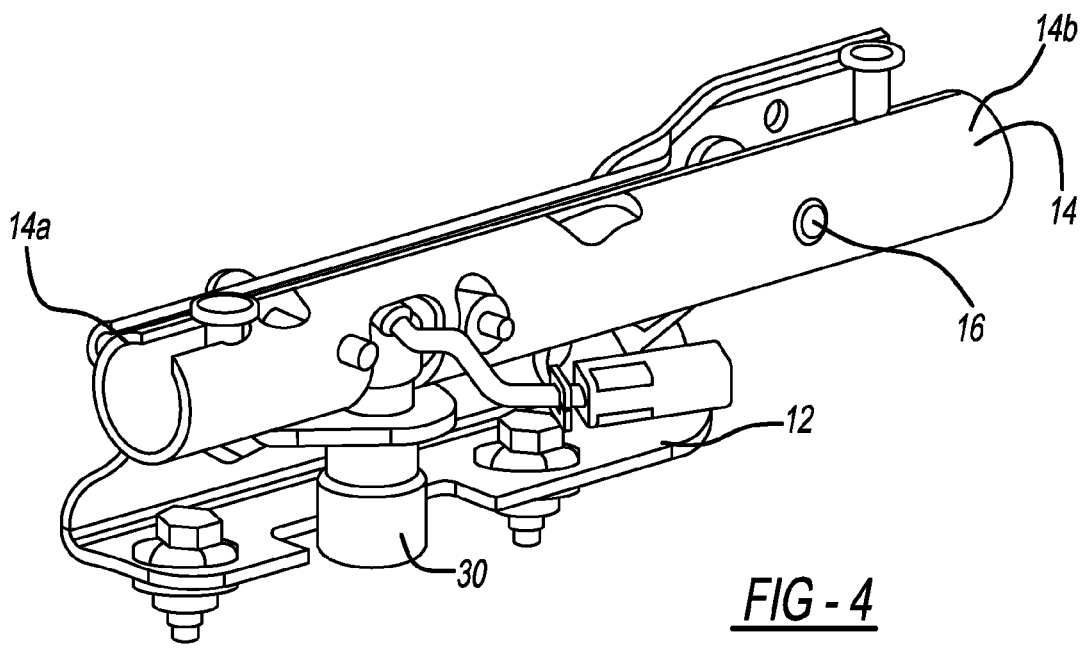
FIG. 4 is a perspective exterior view of the embodiment shown in FIG. 1.

A motion-limiting mechanism (generally designated 18) is provided for limiting rotation of the tubular link 14 with respect to the intermediate link 12 after hinge activation. In the embodiment shown in FIGS. 1-4, motion-limiting mechanism 18 includes a guide bracket 20 formed integrally with or otherwise affixed to the intermediate link 12 so as to rotate with the intermediate link, and a guide or limiting element 24 secured to the tubular link 14. Bracket 20 has an arcuate or bean-shaped slot 22 sized to receive a portion of a guide element 24 therein. Guide element 24 extends from the tubular link so as to interengage the bracket 20 via slot 22. Slot 22 has a first end 22a and a second end 22b. As seen in FIGS. 1 and 2, prior to activation of the hinge mechanism, the guide element engages slot 22 near slot first end 22a.

After activation of the hinge mechanism, intermediate link 12 rotates with respect to base 11, and tubular link 14 rotates with respect to intermediate link 12. During rotation of the intermediate link 12, the bracket 20 and slot 20a rotate and move along the guide element 24 until the guide element 24 abuts an edge of slot second end 22b, thereby halting further rotation of the attached tubular link with respect to the intermediate link. In a particular embodiment, guide element 24 is in the form of a rivet or pin attached to the tubular link 14. Alternative types of motion-limiting mechanisms configurable to limit rotation of the tubular member may also be used. In an alternative embodiment, the guide element 24 is attached to the intermediate link 12 and the bracket 20 is attached to the tubular link.

In embodiments described herein, an actuator 30 is provided for exerting a force on tubular link end 14a, thereby rotating the tubular link 14 about pivot 16 upon activation of the hinge mechanism. Actuator 30 may be in the form of a known or suitable micro-gas generator, or another pyrotechnic or other type of gas generating system. The micro-gas generator may include housing 30a and a piston 30b (not shown) disposed within the housing. Responsive to activation of the gas generator, pressurized gases are generated within the housing, propelling a portion of the piston 30b out of the housing in a known manner. The gas generating system may be activated by an activation signal received from a suitable sensor or other vehicle sub-system, in a manner known in the art. In the embodiments shown herein, at least a portion of the gas generator housing 30a resides within the tubular link 14.

Actuator 30 is operatively coupled to tubular link 14 so as to such that actuator housing 30a moves with the tubular link (i.e., such that there is no relative motion between the housing and the tubular link). The actuator may be rotatably coupled to the link 14, or the actuator may be attached to the link so that there is no rotation of the actuator housing with respect to the link during operation of the mechanism. In a particular embodiment, the actuator is a mini hood actuator having a piston stroke length of 15 mm-stroke. Other suitable alternative actuators may also be used.

In particular embodiments, the actuator 30 is also oriented within tubular link 14 such that a piston 30b positioned within the actuator housing moves generally downwardly out of housing 30a (in direction "A" shown in FIG. 2, toward a road surface on which the vehicle resides) upon gas generator activation, to push end 14a of the tubular link and the rear portion of the hood coupled thereto in a generally upward direction (direction "B" opposite direction "A", shown in FIG. 2). The emerging piston 30b contacts a portion of the base 11 or another portion of the vehicle positioned which acts as a bearing surface (not shown) for the piston. As the piston contacts and pushes against this bearing surface, the reaction force generated on the housing 30a pushes the housing, the attached tubular link 14 and the attached hood rear portion 100a upwardly, away from the vehicle.

In alternative embodiments, the actuator is attached to the vehicle and oriented so that the actuator piston exits the actuator housing in a generally upward direction, bearing against the tubular link 14 and forcing tubular link end 14a upward as previously described.

Contact of the pedestrian with the hood causes compression of the gases in the actuator by forcing the piston in a direction back into the housing 30a. The actuator may be structured to vent (in a controlled manner) the pressurized gases responsive to pressure due to pedestrian contact.

Referring to FIG. 2, in embodiments described herein, actuator 30 is positioned and secured to tubular link 14 such that a perpendicular distance D between a line of action L of piston 30b and a line L1 taken through an axis of rotation of the tubular link 14 and parallel to the piston line of action L, is shorter than the corresponding distance between an axis of rotation of a rotatable portion of a conventional hood lifting mechanism and an actuator line of action in a conventional hood lifting mechanism. In particular embodiments, the distance D is within the range 25-200 millimeters.

A reset and latching mechanism (generally designated 34) may be provided to enable the rear portion of the hood to be returned to and secured in its normal resting position, after the active hinge mechanism has lifted the hood rear portion.

In one embodiment, the reset and latching mechanism is spring-loaded and includes a first portion (not shown) formed integrally with or operatively coupled to intermediate link 12, and a second portion (not shown) formed integral with or operatively coupled to tubular link 14. The first and second reset mechanism portions are pivotally or rotatably coupled to each other by a pin 34a or other suitable member. A spring member (in the embodiment shown, a coil spring member 34b) is in contact with the first and second reset mechanism portions and acts on the reset mechanism portions so as to urge upward motion rotation of the tubular member with respect to the intermediate member, in the hood lifting direction (direction B in FIG. 2). A latch mechanism 34c (not shown) is provided to hold the tubular link 14 in or close to the pre-actuation orientation with respect to the intermediate link 12, after activation of actuator 30 and deployment of the active hinge mechanism.

FIG. 2 also shows the compact arrangement of the elements of the active hinge mechanism within a zone defined by planes P1 ands P2 extending along opposite sides of the tubular link 14. This arrangement minimizes the vertical space under the hood occupied by the active hinge mechanism.

Figure 5:
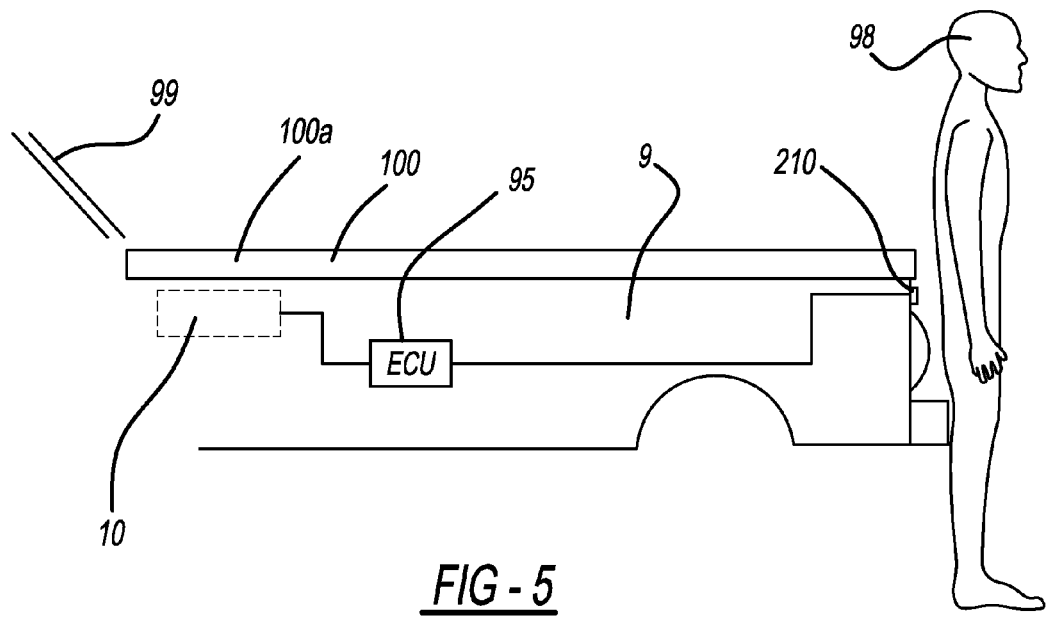
FIG. 5 is a schematic view of an integrated active hinge mechanism in accordance with an embodiment described herein incorporated into a pedestrian safety system in a vehicle, and prior to activation of the hinge mechanism.

Referring to FIG. 5, active hinge mechanism 10 may be in operable communication with a sensor 210 which is in communication with a processor or ECU 95 implementing a known algorithm that signals actuation the active hinge mechanism 10 via activation of an associated actuator 30 (as previously described)(not shown) incorporated into the hinge mechanism. Activation of the actuator 30 may be based on any desired criteria, for example, detected actual or imminent contact of the vehicle with a pedestrian 98, and/or any other desired criteria.

Figure 6:
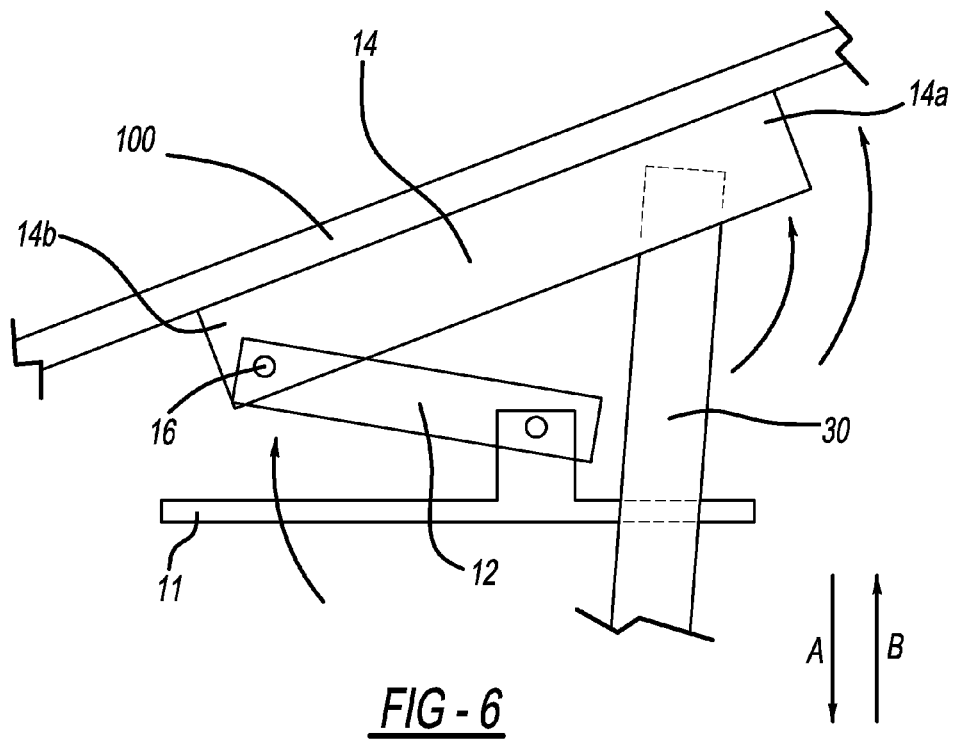
FIG. 6 is a schematic view of an integrated active hinge mechanism in accordance with an embodiment described herein (such as the embodiment shown in FIG. 5) showing operation of the mechanism after activation of the mechanism and during lifting of the hood.

Referring to FIG. 6, in operation of the hinge mechanism, after activation of the mechanism, actuator piston deploys downwardly (or upwardly) from housing 30a, causing pin 40a to shear and releasing tubular link 14 for rotation. End 14a of the link is forced upwardly, producing rotation of tubular link 14 with respect to intermediate link 12 and rotation of intermediate link 12 with respect to base 11. Hood end 100a attached to tubular link 14 also moves upwardly.

During rotation of the intermediate link 12, the bracket 20 and slot 20a rotate and move along the guide element 24 until the element abuts an edge of slot second end 22b, thereby halting further rotation of the attached tubular link with respect to the intermediate link. In a particular embodiment, guide element 24 is in the form of a rivet or pin attached to the intermediate link 12. Alternative types of motion-limiting mechanisms configurable to limit rotation of the tubular member may also be used.

In operation of the reset latch mechanism, after deployment of the active hinge mechanism, pressing the rear portion 100a of the hood 100 downwardly acts against the reset mechanism spring force pushes the piston 30b back into the actuator housing 30a. When the rear portion of the hood is forced at or below its normal operating configuration, the reset latch engages to secure the tubular link 14 at or close to its pre-deployment orientation, against the upward force exerted by the spring. This enables the rear portion of the hood to be rest and secured in the pre-deployment configuration after hinge mechanism deployment.

Figure 7:
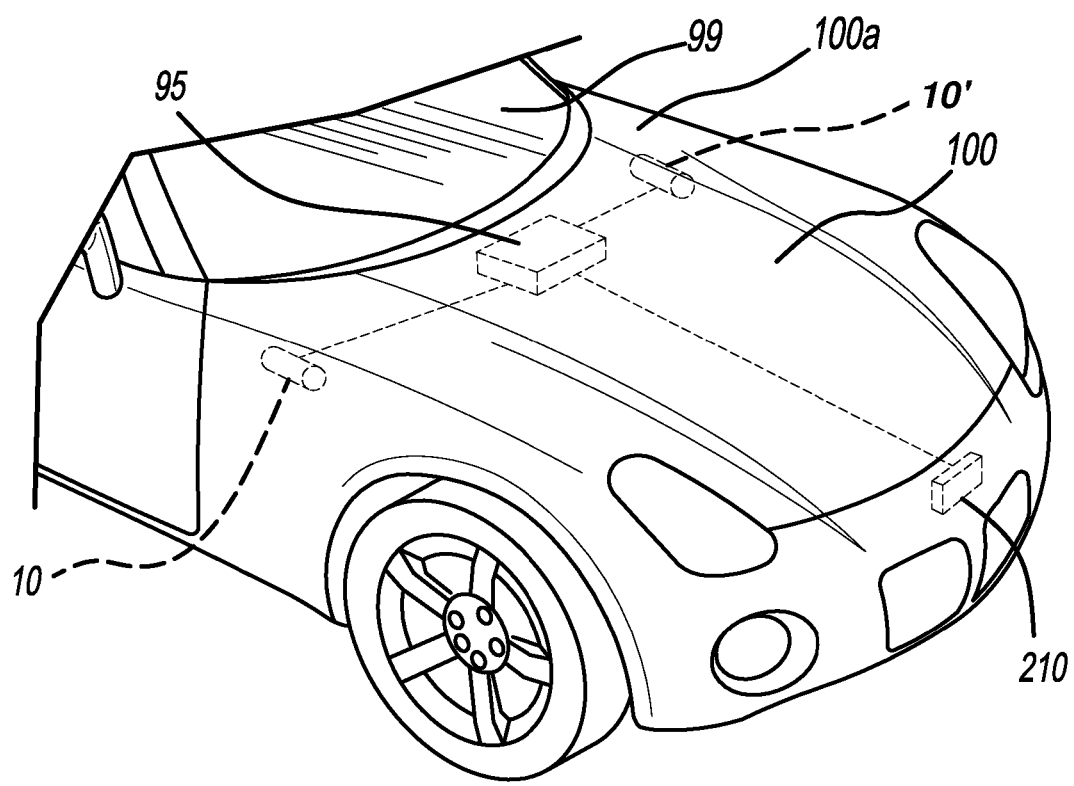
FIG. 7 is a perspective view of a portion of a vehicle incorporating a pedestrian safety system as shown in FIG. 5, with a pair of integrated active hinge mechanisms positioned along an underside of the vehicle hood.

FIGS. 5 and 7 show a particular application of an integrated active hinge mechanism in accordance with the present invention. Referring to FIGS. 5 and 7, at least one integrated active hinge mechanism 10 is incorporated into a pedestrian safety system. FIGS. 5 and 7 show schematic diagrams of one exemplary embodiment of such a safety system. In FIGS. 5 and 7, a pair 10, 10' of active hinge mechanisms (FIG. 7) in accordance with embodiments described herein, may be spaced laterally apart from a fore-aft axis of the vehicle (not shown) on either side of the axis under the vehicle hood 100, and attached to portions of the vehicle proximate the rear of the hood. When activated, these mechanisms combine to lift spaced apart portions of the rear of the hood, in a known manner. As known in the pertinent art, lifting the rear portion of the hood and maintaining the elevated hood portion in a position spaced apart from its normal resting position on the vehicle can aid in cushioning the impact of a pedestrian on this portion of the hood.

It should be noted that the term "exemplary" as used herein to describe various embodiments is intended to indicate that such embodiments are possible examples, representations, and/or illustrations of possible embodiments and such term is not intended to connote that such embodiments are necessarily extraordinary or superlative examples.

The terms "coupled," "connected," and the like as used herein means the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It will be understood that the foregoing description of the embodiments of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. An active hinge mechanism structured for lifting a portion of a hood of a vehicle, the hinge mechanism comprising a tubular link structured for operative coupling to the hood so as to transmit a lifting force to the hood after activation of the mechanism.

2. The hinge mechanism of claim 1 wherein the tubular link includes a cylindrical outer wall defining an interior structured to receive therein portions of elements of the hinge mechanism.

3. The hinge mechanism of claim 2 further comprising an intermediate link and a pivot element rotatably coupling the tubular link to the intermediate link, wherein at least a portion of the pivot element is received within the tubular link interior.

4. The hinge mechanism of claim 2 further comprising an intermediate link rotatably coupled to the tubular link, and a shear pin coupling the tubular link to the intermediate link so as to prevent rotation of the tubular link with respect to the intermediate link prior to activation of the hinge mechanism, and wherein at least a portion of the shear pin is received within the tubular link interior.

5. The hinge mechanism of claim 2 further comprising an intermediate link rotatably coupled to the tubular link, and a motion-limiting mechanism including:

a first portion coupled to one of the intermediate link and the tubular link, and a second portion coupled to the other one of the intermediate link and the tubular link, and wherein the first and second portions are structured to interengage so as to limit rotation of the tubular link with respect to the intermediate link after activation of the hinge mechanism.

6. The hinge mechanism of claim 2 further comprising an intermediate link rotatably coupled to the tubular link, and an actuator coupled to the tubular link so as to move with the tubular link, the actuator being structured to produce a rotation of the tubular link with respect to the intermediate link after activation of the hinge mechanism, and wherein at least a portion of the actuator is received within the tubular link interior.

7. The hinge mechanism of claim 6 wherein the actuator comprises a piston-and-cylinder arrangement, and wherein the actuator is oriented so that the piston deploys in a direction away from the hood upon activation of the hinge mechanism.

8. A vehicle including the active hinge mechanism in accordance with claim 1.

9. A pedestrian safety system including the active hinge mechanism in accordance with claim 1.

* * * * *